Dec. 7, 1965   J. S. ECKERT   3,222,040
SUPPORT PLATE FOR PACKED TOWER
Filed June 25, 1962   2 Sheets-Sheet 1

INVENTOR.
JOHN S. ECKERT
BY
ATTORNEY

Dec. 7, 1965  J. S. ECKERT  3,222,040
SUPPORT PLATE FOR PACKED TOWER
Filed June 25, 1962  2 Sheets-Sheet 2

INVENTOR.
JOHN S. ECKERT
BY
ATTORNEY

United States Patent Office 3,222,040
Patented Dec. 7, 1965

3,222,040
SUPPORT PLATE FOR PACKED TOWER
John S. Eckert, 3000 Millboro, Silver Lake, Ohio
Filed June 25, 1962, Ser. No. 204,907
5 Claims. (Cl. 261—94)

This application is a continuation-in-part of my application Serial No. 803,430 filed April 1, 1959 (now abandoned).

This invention relates to a sectional support plate for a packed tower. The sections are constructed to be supported at their ends and carry a bed of packing elements.

The support plate for the tower is made up of beams or sections, each of which is narrow enough to go through a manway in the wall of the tower near the support ledge or ring which measures usually 18 to 20 inches across. The tower may be 4 to 12 or more feet in diameter so that the support plate includes at least one section near its middle which receives no side support from the tower wall, and there may be as many as twelve or more sections which are supported at their ends only.

A bed of packing elements is heavy. The middle sections of the support plate may have to carry a load of up to five tons or more. Furthermore, the support plate must be perforated to provide for the flow of gas and liquid through the tower, and these perforations weaken the support plate structure. Each section is designed with an upper perforated portion for the injection of gas into the bed of packing elements, and there is a horizontal portion, preferably on each side thereof which is perforated for the drainage of liquid. In the most efficient designs there is a substantially complete separation of the gas and liquid at the support plate.

The support plate sections are arched. They are fabricated of sheet metal, and to make them sufficiently strong structurally to carry a heavy bed of packing elements and yet permit uniform injection of gas and removal of liquid: (1) the walls of the arch taper gradually upward being nearer together adjacent the top of the arch than at their bottoms so that the area available for gas flow in the packed bed increases as the amount of gas injected from the support plate into the bed increases, and (2) the outer edge of each base portion is directed vertically upward or downward. The edges are preferably directed downward because this gives greater strength per unit weight of metal. However, in some instances the edges may be directed upward at a small sacrifice of strength and to gain reduced head room and confinement of liquid.

To facilitate the separation of the gas and the liquid the lower portion of each wall of the arch is preferably imperforate so that the liquid collects on the base portions with sufficient head to prevent gas passing up through the perforations in these portions through which the liquid drains; and the top of the arch may be perforated for the escape of gas there as well as through perforations in the walls, but often the top is imperforate so that the gas is injected out through the perforations in the walls and thus prevents liquid entering the tops with consequent interference to flow of the gas into the packed bed.

The invention is further described in connection with the accompanying drawings, in which.

Figure 1:
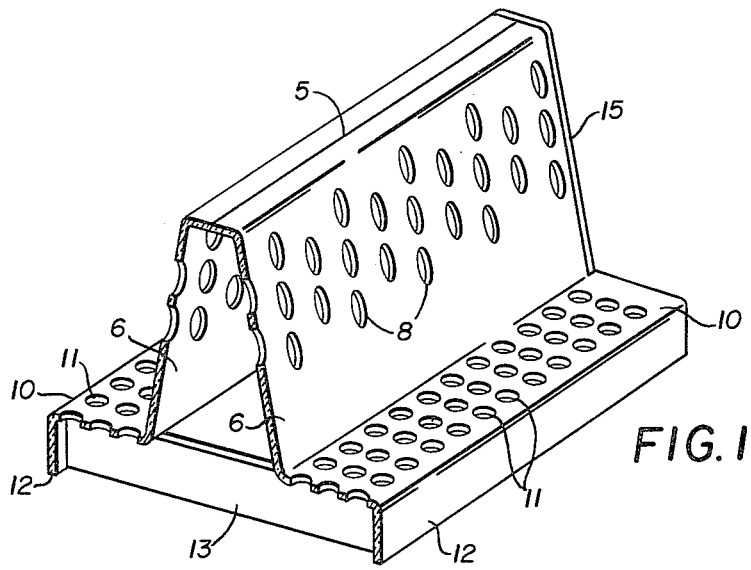
FIGURE 1 is a view in perspective of part of one type of section.
Figure 2:
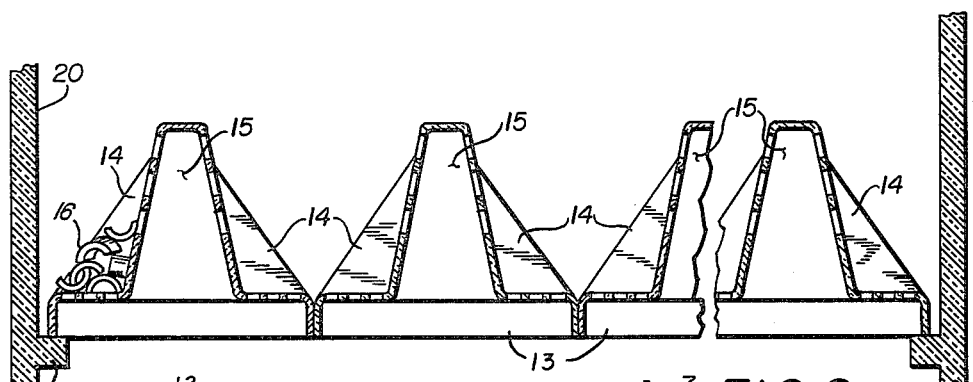
FIGURE 2 is a vertical section through a tower showing a number of such sections, on the line 2—2 of FIGURE 3.
Figure 3:
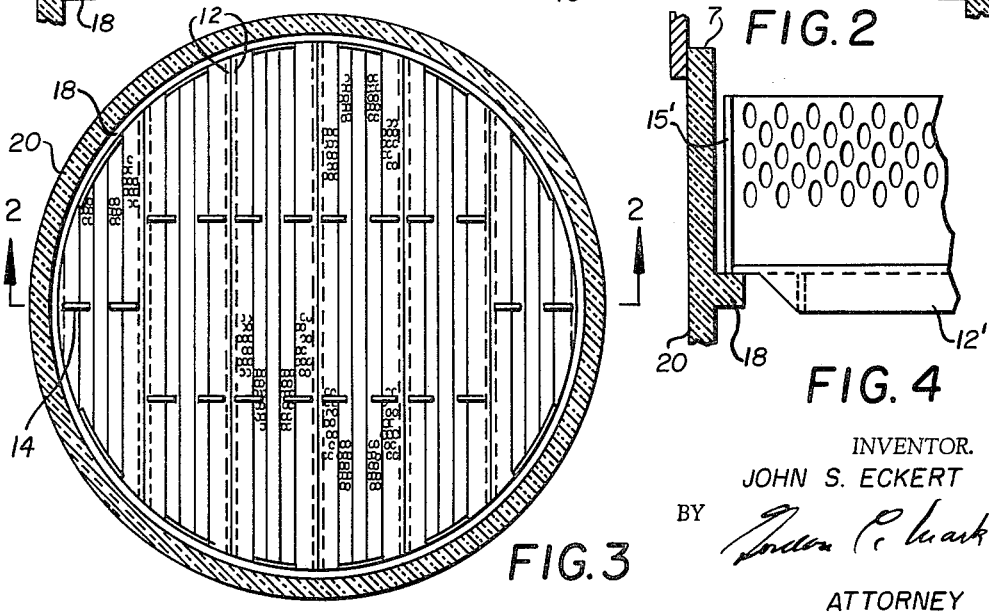
FIGURE 3 is a cross-sectional view through the tower, showing the top of the support plate.

Although preferably made of a single sheet of metal, each section may be made in two parts and then welded along the center line 5 (FIGURE 1). The walls 6 taper upwardly being closer together at the top than at the bottom. The section is narrow enough to pass through the manway 7. The perforations 8 for gas may be concentrated in the upper portion of each wall. The top of the arch may be perforated. The base portions 10, perforated at 11, are turned down at right angles along their outer edges to form flanges 12, which materially increase the load-bearing capacity of the section. Rectangular braces 13 are welded in position under the base portions at intervals to maintain the shape of the section and thus increase its strength. External braces 14 located at intervals, are optional. The end braces 15 are also optional and may slant inward instead of being vertical. Such braces may be located at intervals along the beam to act as stiffeners. They not only strengthen the section to support packing elements 16, but also prevent the gas from escaping out the ends of the section. Sections of this type suitably braced internally and/or externally, made of 10 gauge steel, more or less, i.e. about 12 gauge to ¼ inch, and up to 12 feet or more in length and about 12 inches wide will support up to five tons or more of packing elements when supported only at both ends. The braces are welded to the section to provide maximum strength.

Figure 4:
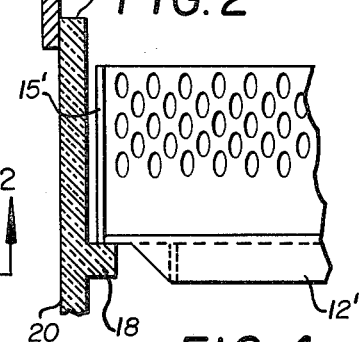
FIGURE 4 is a vertical view of an end of a modified type of section of the same general type resting on a ledge or ring in a tower.

FIGURE 4 shows a somewhat modified structure in which the down-turned edge flanges 12' are cut away at the ends so that the base portions of the section rest directly on the ledge or ring 18 of the tower 20, and the end brace 15' is welded against the end of the section.

Most towers are circular in cross section. The ends of the central beams or sections are rounded to conform to the round wall. As the sides of the tower are approached, flat perforated plates (preferably with edges turned down for strength), rounded to the shape of the wall, can replace arched sections, such as shown in the drawings.

Figure 5:
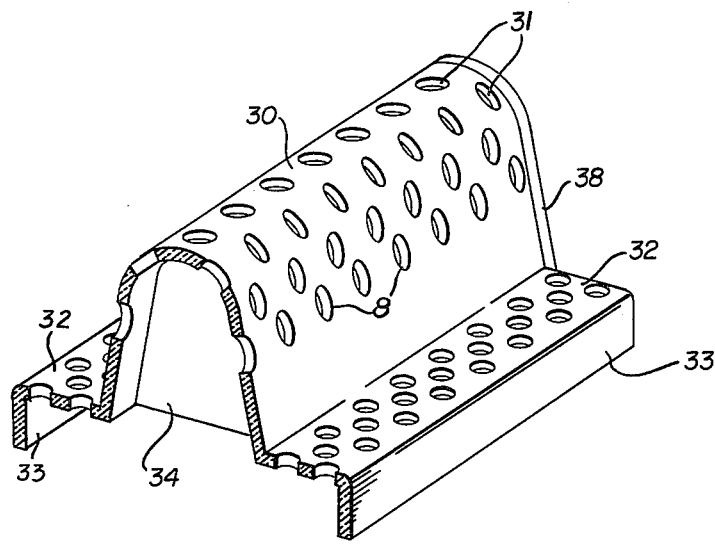
FIGURE 5 is a view in perspective of part of a different type of section.
Figure 6:
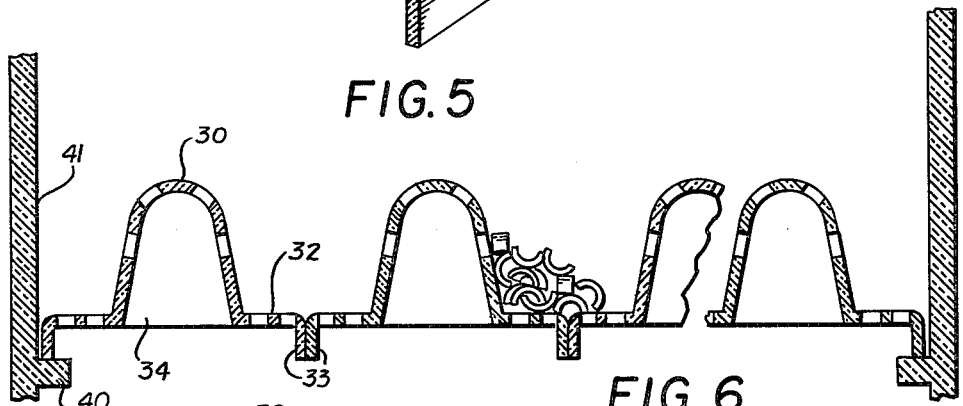
FIGURE 6 is a vertical section through a tower showing a number of such sections, on the line 6—6 of FIGURE 7.
Figure 7:
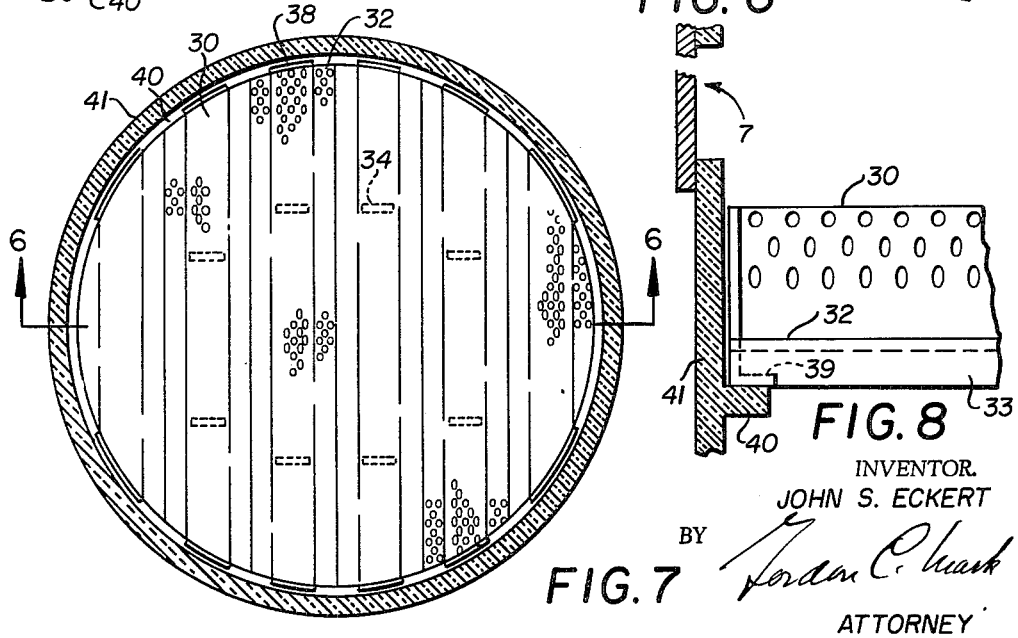
FIGURE 7 is a cross-sectional view through the tower, showing the top of the support plate.
Figure 8:
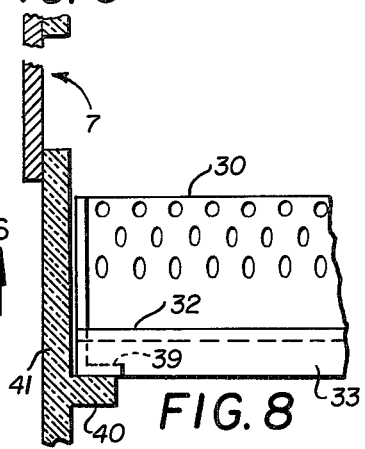
FIGURE 8 is a vertical view of an end of the section resting on a ledge or ring in a tower.

The structure of the section shown in FIGURE 5 is similar to those shown in FIGURES 1 to 4, except that the top 30 is rounded. There may or may not be perforations 31 in the top as well as in the walls. The perforated base portions 32 and flanges 33 are similar. Internal braces 34 are located at regular intervals to prevent buckling of the section, and maintain the shape of the walls. These braces may extend further down than indicated in FIGURES 5 and 6 and brace the down-turned flanges 33, similar to the braces 13 in FIGURES 1 and 2. The end is preferably provided with a closure plate 38 to prevent the escape of gas adjacent the tower wall instead of into the interior of the packing bed. The bottom of the closure plate 38, as shown in FIGURE 8 preferably is provided with flange 39 across its bottom which extends horizontally the width of the support ledge 40 to give maximum bearing area and to brace the turned-down flanges 33. Thus the flanges 33 and the closure plate 38 rest on the ledge or ring 40 in the tower 41.

The invention is covered in the claims which follow.

What I claim is:

1. A support plate to support a bed of packing elements, which support plate is composed of sections adapted to be supported only at their ends, each section being of metal, the upper portion of the support plate being generally arched in cross section, the distance between the sides of the arch gradually widening from a location adjacent the top of the arch to a location adjacent the bottom of the arch, the walls of the arch being perforated at least in the upper part of each, a perforated base portion extending horizontally outward from the bottom of each wall of the arch with the outer edge thereof turned down at right angles from a location adjacent one end of the section to a location adjacent the other end of the section whereby the weight of packing elements which the section can carry is materially increased, the middle of said sections, at least, being braced to maintain the strength and shape of the section.

2. A support plate to support a bed of packing elements, which support plate is composed of sections adapted to be supported only at their ends, each section being of metal, the upper portion of the support plate being generally arched in cross section, the distance between the sides of the arch gradually widening from a location adjacent the top of the arch to a location adjacent the bottom of the arch, the walls of the arch being perforated at least in the upper part of each, a perforated base portion extending horizontally outward from the bottom of at least one wall of the arch with the outer edge of said horizontal base portion having portions turned down at right angles from a location spaced a short distance from each end of the section with areas at the ends of said horizontally extending portions in said short distances being free from said down-turned portions, the middle of said sections, at least, being braced to maintain the strength and shape of the section.

3. A support plate to support a bed of packing elements, which support plate is composed of sections adapted to be supported only at their ends, each section being of metal, the upper portion of the support plate being generally arched in cross section, the distance between the sides of the arch gradually widening from a location adjacent the top of the arch to a location adjacent the bottom of the arch, the walls of the arch being perforated at least in the upper part of each, a perforated base portion extending horizontally outward from the bottom of at least one wall of the arch with the outer edge of said horizontal base portion turned at right angles from a location adjacent one end of the section to a location adjacent the other end of the section whereby the weight of packing elements which the section can carry is materially increased, the wall of the arch above said horizontal base portion being flat from the base portion to a location adjacent the top of the arch, with a flat strengthening flange outside of the section one edge of which is fastened to the base portion of the section and another edge of which is fastened to said flat portion of the wall and extends substantially the whole height of said flat portion.

4. A support plate to support a bed of packing elements, which support plate is composed of sections adapted to be supported only at their ends, each section being of metal, the upper portion of the support plate being generally arched in cross section, the distance between the sides of the arch gradually widening from a location adjacent the top of the arch to a location adjacent the bottom of the arch, the walls of the arch being perforated at least in the upper part of each, a perforated base portion extending horizontally outward from the bottom of each wall of the arch with the outer edge of said horizontal base portion turned down at right angles, and in at least some of the sections a strengthening brace with right-angular end portions which fit against the under surface of the horizontal base portions and against the down-turned edges thereof.

5. A support plate to support a bed of packing elements, which support plate is composed of sections adapted to be supported only at their ends, each section being of metal, the upper portion of the support plate being generally arched in cross section, the distance between the sides of the arch gradually widening from a location adjacent the top of the arch to a location adjacent the bottom of the arch, the walls of the arch being perforated at least in the upper part of each, a perforated base portion extending horizontally outward from the bottom of at least one wall of the arch with the outer edge of said horizontal base portion turned at right angles from a location adjacent one end of the section to a location adjacent the other end of the section whereby the weight of packing elements which the section can carry is materially increased, the middle of said sections, at least, being braced to maintain the strength and shape of the section, and in each end of some of the sections a closure plate which prevents the escape of gas from the ends thereof and the bottom of which is flanged to provide a bearing area.

References Cited by the Examiner

UNITED STATES PATENTS

| 999,320 | 8/1911 | Kyll | 261—95 X |
|---|---|---|---|
| 1,605,264 | 11/1926 | Millard | 261—114 |
| 1,785,983 | 12/1930 | Sebald | 261—114 |
| 1,969,918 | 8/1934 | Wright. | |
| 2,767,967 | 10/1956 | Hutchinson | 261—113 |
| 3,018,094 | 1/1962 | Mikkelson | 261—113 |
| 3,064,954 | 11/1962 | Eckert | 261—98 |
| 3,070,360 | 12/1962 | Rafferty et al. | 261—113 |
| 3,079,134 | 2/1963 | Winn | 261—113 |

FOREIGN PATENTS 933,506  9/1955  Germany.

OTHER REFERENCES

"Support Plates, Distributors, and Hold-Down Plates," Design Manual TA–40R, U.S. Stoneware Corp., Akron 9, Ohio, 32 pages, Copyright 1960.

HARRY B. THORNTON, *Primary Examiner.*

HERBERT L. MARTIN, *Examiner.*